Figure 1:
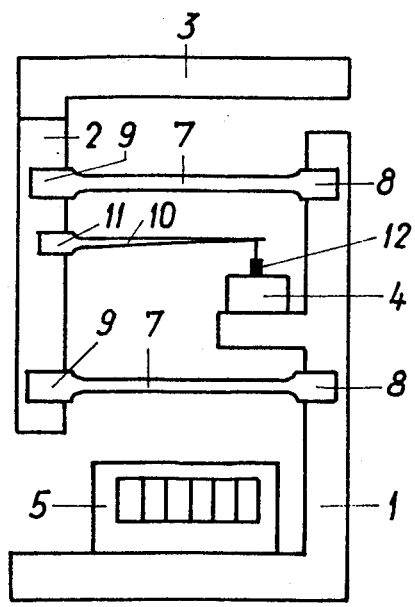

United States Patent [19]

Gallo et al.

[11] 4,300,648

[45] Nov. 17, 1981

[54] MASS AND FORCE METER

[75] Inventors: Mario Gallo; Johannes Wirth, both of Zurich, Switzerland

[73] Assignee: Wirth, Gallo & Co., Zurich, Switzerland

[21] Appl. No.: 68,528

[22] Filed: Aug. 21, 1979

[30] Foreign Application Priority Data

Mar. 24, 1979 [EP] European Pat. Off. ............ 79100900

[51] Int. Cl.³ .............................................. G01G 3/08
[52] U.S. Cl. .................................... 177/229; 177/255
[58] Field of Search ................. 177/229, 211, 210 FP, 177/255, 189; 73/141 A

[56] References Cited

U.S. PATENT DOCUMENTS

| | | | |
|---|---|---|---|
| 4,070,900 | 1/1978 | Engels | 177/210 FP X |
| 4,072,202 | 2/1978 | Storace | 177/229 |
| 4,179,004 | 12/1979 | Ebbinge | 177/211 |
| 4,196,784 | 4/1980 | Suzuri | 177/211 |

FOREIGN PATENT DOCUMENTS

| | | |
|---|---|---|
| 1294055 | 4/1963 | Fed. Rep. of Germany . |
| 2040987 | 3/1971 | Fed. Rep. of Germany . |
| 2107867 | 5/1972 | France . |
| 2112216 | 6/1972 | France . |
| 2356918 | 1/1978 | France . |
| 2383437 | 11/1978 | France .............................. 177/189 |
| 591685 | 6/1977 | Switzerland . |
| 777941 | 7/1957 | United Kingdom . |

Primary Examiner—Joseph W. Hartary
Attorney, Agent, or Firm—Stevens, Davis, Miller & Mosher

[57] ABSTRACT

Mass and force meter with a frame, a load support guided parallely and vertically by parallel guiding means comprising at least two flat springs lying in two at least substantially parallel planes lying one above the other, with a rigid measuring system and a resilient transmission element transmitting only a part of the weight of the mass to be measured or of the force to be measured to the measuring system, said flat springs being fitted in said frame and said load support.

5 Claims, 12 Drawing Figures

MASS AND FORCE METER

The invention relates to a mass and force meter with a frame, a load support, means or its parallel and vertical guidance, a rigid measuring system and a transmission element transmitting a part of the weight of the mass or of the force to be measured to said measuring system. A rigid measuring system is a measuring system in which the load input when loaded makes only a virtual movement. The mass or force to be measured must often be strongly reduced before it acts on the measuring system.

Such devices are known, for instance from U.S. Pat. No. 3,424,999. Many measuring systems, e.g. piezo-electrical meters or weighing scales with vibrating strings accept only input forces within a narrow range. If large loads must be measured it is therefore necessary to provide reducing elements, e.g. levers, which are correspondingly dimensioned. At the same time the means for parallel and vertical guidance, which comprise for instance guides and articulations, must also be dimensioned so as to accept large loads. The costs involved can quite considerably increase the final price of the meter.

It is an object of the invention to provide means allowing a reduction of the mass or force to be measured also in case of large loads, e.g. masses of 300 kg, without requiring considerable expenses.

According to the invention, this can be achieved in that said means for parallel and vertical guidance of said load support comprise at least two flat springs mounted in two at least substantially parallel planes lying one above the other, the ends of flat spring being fitted in said frame and in said load support, said transmission element being made from a resilient material.

In the enclosed drawing embodiments of the invention are represented schematically.

Figure 2:
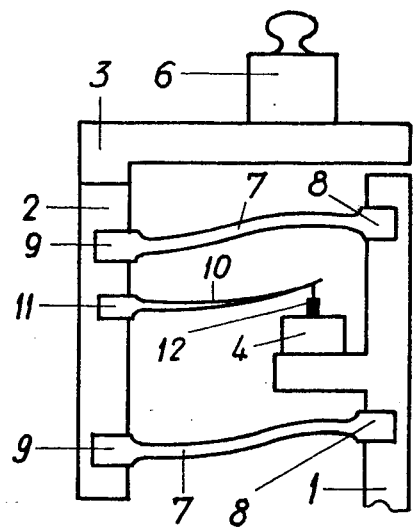
Figure 3:
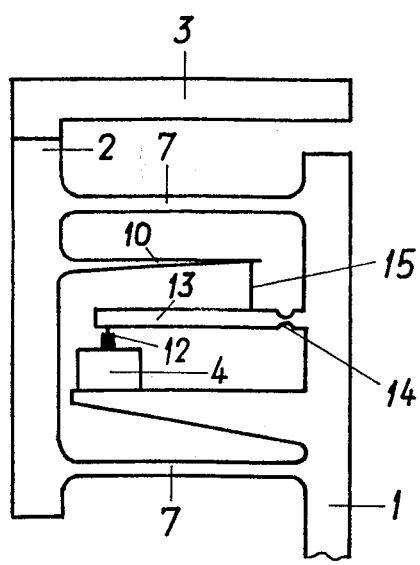
Figure 4:
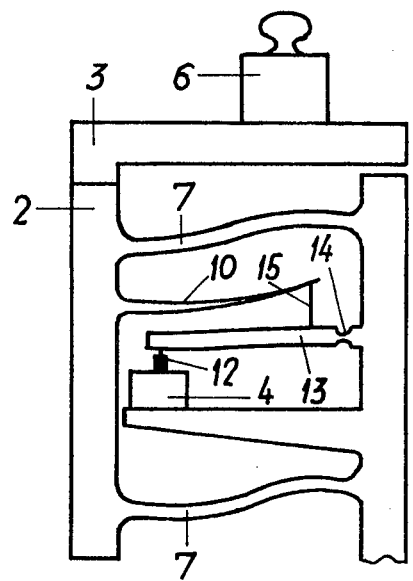
Figure 5:
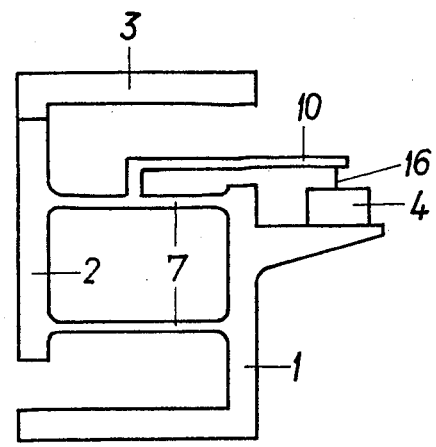
Figure 6:
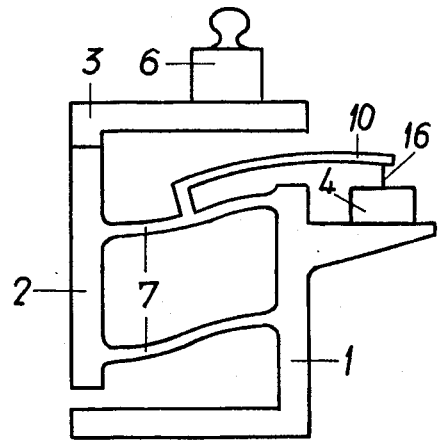
Figure 7:
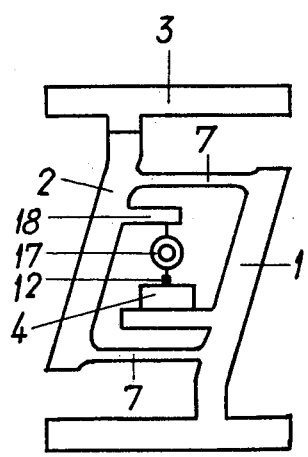
Figure 8:
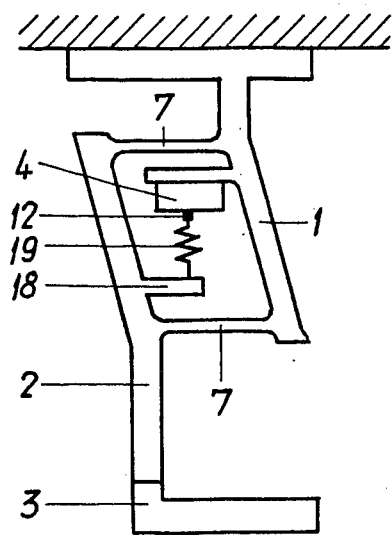
Figure 9:
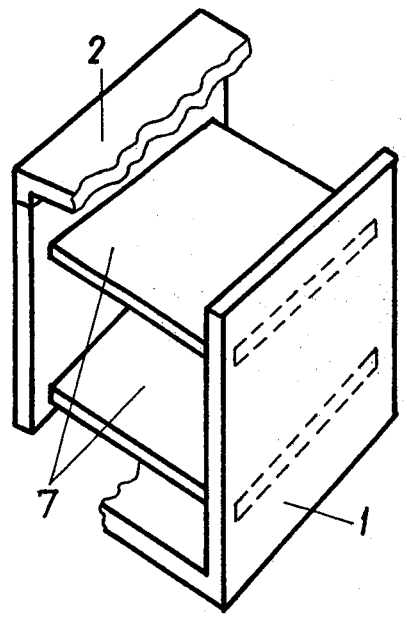
Figure 10:
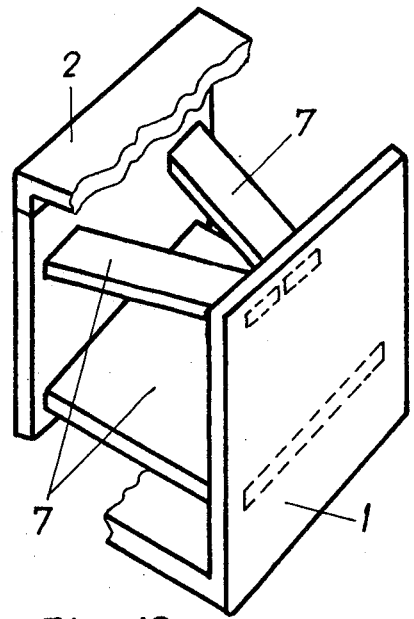
Figure 11:
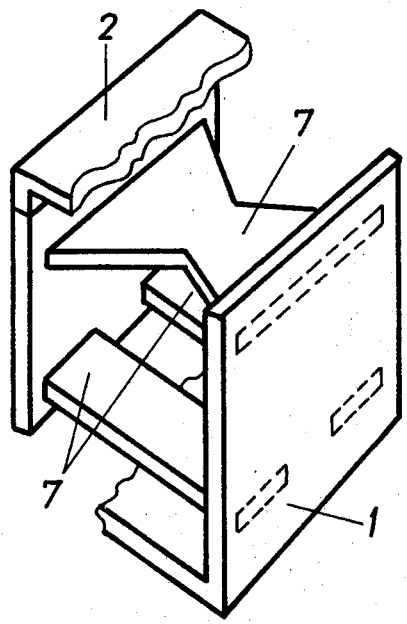

FIGS. 1, 2 show a first embodiment,
FIGS. 3, 4 show a second embodiment,
FIGS. 5, 6 show a third embodiment,
FIGS. 7, 8 show each an embodiment with a different transmission element,
FIGS. 9–12 show each a variant of the flat spring forming the guidance means.

In FIG. 1 a mass meter, i.e. a weighing scale is schematically represented. It comprises in a well known manner a frame 1, a load support 2, a platform 3, a measuring system 4 fixed to frame 1 and a computing and display device 5 connected to measuring system 4. Measuring system 4 is a rigid measuring system, i.e. a measuring cell of known design with two vibrating strings or a piezo-electrical feeler. The variations of frequency provoked by the action of the weight of mass 6 to be measured are transmitted to computing and display device 5 and the magnitude of mass 6 is computed therefrom and displayed with the suitable units.

Load support 2 is guided parallely and vertically with regard to frame 1. The means for parallel guidance comprise two flat springs 7 mounted each in one of two substantially parallel planes lying one above the other. The ends of flat springs 7 are fitted in frame 1 at 8 and in load support 2 at 9. A transmission element 10 formed by a flat spring has one of its ends fitted in load support 2 at 11. The free end of transmission element 10 acts on measuring system 4 by means of a rod 12, so that only vertical forces are transmitted to measuring system 4.

When the weight of mass 6 to be measured (FIG. 2) acts on flat springs 7, they are submitted substantially to flexion only and take an S form. Their characteristic, i.e. their force-displacement function, is to be chosen according to the application considered. When load support 2 with platform 3 moves downwards, the flat spring comprising transmission element 10 is elastically distorted as the vertical position of its right hand end is determined by rod 12. Flat springs 7 are so dimensioned that they bear the main part of the load. The remaining part, called the measuring force, is compensated by transmission element 10 and transmitted to measuring system 4. When springs 7 and transmission element 10 are suitably designed the force acting on measuring system 4 is proportional to the weight of mass 6. As flat springs remain absolutely stiff in their own plane, here in horizontal planes, the horizontal position of load support 2 with regard to frame 1 is always statically determined.

A practical implementation of such a mass meter could be based on the following data:
Length of springs 7: 100 mm
Vertical movement under load action: 0,3 mm
Load component compensated by springs 7: 99%
Load component compensated by transmission element: 1%
Maximum load: 3000 N
Maximum measuring force: 30 N A further embodiment is represented in FIGS. 3,4. Only those elements differing from those of FIGS. 1,2 are represented. Flat springs 7 and transmission element 10 are integral with frame 1 and load support 2. This is a way of fitting construction elements into each other, at least as far as the behavior of flat springs is concerned. A lever 13 fixed to frame 1 by means of an elastic articulation 14 is mounted between transmission element 10 and rod 12. The right hand end of transmission element 10 acts upon lever 13 by means of a further rod 15. This implementation allows to enlarge the virtual displacement of the end of lever 13 with regard to the vertical downwards movment of load support 2. For instance, if this downwards movement were to be 0,3 mm the virtual movement would be 1,5 mm. Such a lever 13 could be mounted in each embodiment of the invention. For the sake of simplicity it is represented and its function explained only with regard to FIGS. 3, 4.

The embodiment according to FIGS. 5, 6 differs from that of FIGS. 3, 4 in that transmission element 10 is integral with the upper flat spring 7. As can be seen from FIG. 6, transmission element 10 exerts a traction on a wire 16 replacing rod 12. When load support 2 is loaded, the left hand side end of tansmission element 10 moves downwards by half the downwards movement of load support 2. At the same time it is slightly turned counterclockwise.

In the embodiment according to FIGS. 1–6 transmission element 10 comprises a flat spring. Other types of elastical transmission elements can also be used. According to FIG. 7 transmission element 17 comprises a circular spring. It is mounted between a rod 12 and an arm 18 of load support 2. A further variant is represented in FIG. 8, in which the transmission element comprises a helical spring 19 on which load support 2 exerts a traction.

Figure 12:
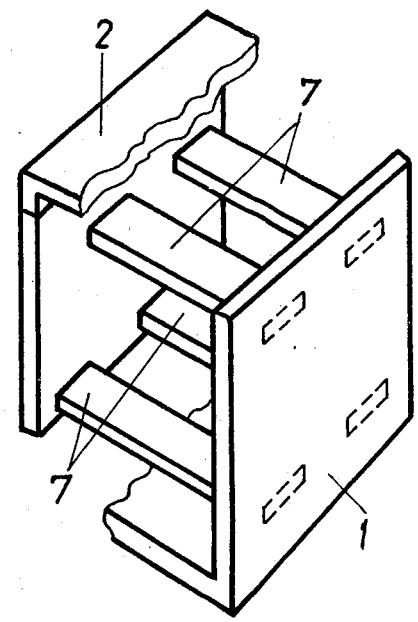

As already mentioned the means for parallel guidance of load support 2 comprise flat springs. FIGS. 9–12 show the different combinations of large and narrow flat springs which can be used as such means. They can comprise two large flat springs (FIG. 9) or one lower, large flat spring and two narrow flat springs forming a V (FIG. 10) or one large, upper flat, X-shaped spring and two narrow, lower, parallely mounted flat springs (FIG. 11) or four narrow flat springs (FIG. 12). All these springs are mounted between frame 1 and load support 2. Form and arrangement of these springs depend on the application which determines their characteristic.

In all arrangements of FIGS. 9-12 the springs lie in two planes which are parallel or at least substantially parallel to each other. When the meter is not loaded these planes are substantially horizontal. The tolerance on their parallelism may be up to 10%.

In the embodiments mass meters have been described. Embodiments as force meters differ only in that a suitable force input point on load support 2 replaces the platform.

We claim

1. In a mass and force meter, a frame, a load support, means for parallel and vertical guidance of said load support and substantial load counter-acting, a rigid measuring system with a load cell, a transmission element, made from a resilient material, transmitting only the remaining part of the mass or the force to be measured not counter-acted by said means directly to said load cell, said means comprising at least two flat springs mounted each in a separate plane, said planes lying one above the other and being at least substantially parallel to each other, said flat springs having two ends, said ends being fitted in said frame and in said load support.

2. In a mass and force meter, a frame, a load support, means for parallel and vertical guidance of said load support and substantial load counter-acting, a rigid measuring system with a load cell, a transmission element, made from a resilient material, transmitting only the remaining part of the mass or the force to be measured not counter-acted by said means directly to said load cell, and having two ends, one of said ends being fitted in said load support, a rod mounted between said measuring system and the other of said ends of said transmission element, said means comprising at least two flat springs mounted each in a separate plane, said planes lying one above the other and being at least substantially parallel to each other, said flat springs having two ends, said ends being fitted in said frame and in said load support.

3. In a mass and force meter, a frame, a load support, means for parallel and vertical guidance of said load support and substantial load counter-acting, a rigid measuring system with a load cell, a transmission element, made from a resilient material, transmitting only the remaining part of the mass or the force to be measured not counter-acted by said means directly to said load cell, said means comprising at least two flat springs mounted each in a separate plane, said planes lying one above the other and being at least substantially parallel to each other, said flat springs having two ends, said ends being fitted in said frame and in said load support, said transmission element being integral with said flat spring lying above said other flat spring, said transmission element having a free end, a wire mounted between said measuring system and said free end, the latter exerting a traction on said wire.

4. In a mass and force meter, a frame, a load support, means for parallel and vertical guidance of said load support and substantial load counter-acting, a rigid measuring system with a load cell, a transmission element, comprising a circular spring or a helical spring, transmitting only the remaining part of the mass or the force to be measured, not counter-acted by said means, directly to said load cell, a rod mounted between said measuring system and said transmission element, said means comprising at least two flat springs mounted each in a separate plane, said planes lying one above the other and being at least substantially parallel to each other, said flat springs having two ends, said ends being fitted in said frame and in said load support.

5. In a mass and force meter, a frame, a load support, means for parallel and vertical guidance of said load support and substantial load counter-acting, a rigid measuring system with a load cell, a transmission element, made from a resilient material and having one free end, transmitting only the remaining part of the mass or the force to be measured, not counter-acted by said means, directly to said load cell, a lever mounted on said frame connected to said free end of said transmission element, a rod mounted between said lever and said measuring system, said means comprising at least two flat springs mounted each in a separate plane, said planes lying one above the other and being at least substantially parallel to each other, said flat springs having two ends, said ends being fitted in said frame and in said load support.

* * * * *